(12) United States Patent
Jackson et al.

(10) Patent No.: US 6,847,404 B1
(45) Date of Patent: Jan. 25, 2005

(54) VIDEO DISPLAY PROTECTION CIRCUIT

(75) Inventors: David Ross Jackson, Indianapolis, IN (US); Dal Frank Griepentrog, Indianapolis, IN (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/787,830

(22) PCT Filed: Sep. 29, 1999

(86) PCT No.: PCT/US99/22660

§ 371 (c)(1),
(2), (4) Date: Mar. 22, 2001

(87) PCT Pub. No.: WO00/19707

PCT Pub. Date: Apr. 6, 2000

Related U.S. Application Data
(60) Provisional application No. 60/102,213, filed on Sep. 29, 1998.

(51) Int. Cl.[7] ............................. H04N 5/63; H04N 5/68; H04N 3/20
(52) U.S. Cl. ..................... 348/378; 315/382.1; 315/411
(58) Field of Search ................................ 348/377, 378, 348/818, 819; 315/364, 382.1, 411; H04N 3/20, 5/63, 5/68

(56) References Cited

U.S. PATENT DOCUMENTS

| | | | |
|---|---|---|---|
| 4,126,816 A | 11/1978 | Willis | |
| 4,169,241 A | 9/1979 | Peer et al. | |
| 4,234,829 A | 11/1980 | Willis | |
| 4,321,513 A | 3/1982 | Knight | |
| 4,335,335 A | 6/1982 | Willis | |
| 4,544,954 A | 10/1985 | Chen | |
| 4,656,399 A | * 4/1987 | Testin et al. ................. | 315/411 |
| 4,905,116 A | * 2/1990 | Stierberger ................ | 361/91.6 |
| 5,047,698 A | 9/1991 | Fernsler et al. | |
| 5,313,294 A | * 5/1994 | Haferl ......................... | 348/377 |
| 5,418,705 A | 5/1995 | Smith et al. | |
| 5,491,794 A | * 2/1996 | Wu .............................. | 714/23 |
| 5,677,730 A | 10/1997 | Park | |
| 5,714,843 A | 2/1998 | Youn | |
| 6,285,401 B1 | * 9/2001 | Griepentrog ................ | 348/380 |

FOREIGN PATENT DOCUMENTS

| | | | |
|---|---|---|---|
| EP | 522328 | 1/1993 | ............ H04N/3/20 |

OTHER PUBLICATIONS
Integrated Circuits, Data Sheet TDA6120Q, Video Output Amplifier Aug. 27, 1997, Philips, pp. 1–16.

* cited by examiner

Primary Examiner—John Miller
Assistant Examiner—Brian Yenke
(74) Attorney, Agent, or Firm—Joseph S. Tripoli; Paul P. Kiel

(57) ABSTRACT

An apparatus and a method for protecting a video display device, having an anode and a cathode, against excessive beam current conditions. In particular, the present invention protects the video display device against zero-biasing of the device, wherein the cathode driver circuit is supplied by a plurality of power supplies and the loss of anyone of the power supplies causes zero-biasing of the cathode. The invention provides, in a video display device (100) having an anode (112) and a cathode (102) for generating and controlling beam currents in the display device, a protection circuit comprising: a source of video signals (36); a driver circuit (40) coupled to the source of video signals and the cathode (102), the driver circuit coupled to a driver circuit power supply (+12V,+215V), the driver circuit causing a cathode voltage to be generated on the cathode in response to the video signals and the driver circuit power supply; a high voltage power supply (X1) coupled to the anode (112) for providing high voltage accelerating potential in the display device; and a shutdown circuit (44) coupled to the driver circuit power supply and the high voltage power supply, the shutdown circuit disabling the high voltage power supply if the driver circuit power supply voltage decreases below a threshold level.

18 Claims, 3 Drawing Sheets

VIDEO DISPLAY PROTECTION CIRCUIT

This application claims the benefit under 35 U.S.C. §365 of International Application PCT/US99/22660, filed Sep. 29, 1999, which was published in accordance with PCT Article 21(2) on Apr. 6, 2000 in English, and which claims the benefit of U.S. Provisional Application Serial No. 60/102,213, filed Sep. 29, 1998.

The present invention relates to a video display protection apparatus and method, and more particularly, to a video display protection circuit for protecting a cathode ray tube from a high beam current condition.

In a video display device comprising a cathode ray tube (CRT), beam current is generated in response to a video signal and accelerated by an accelerating potential to cause the beam to strike a phosphor coated screen. In such a display device, several different voltages are required to generate the beam current, focus the beam and accelerate the beam toward the screen. These voltages include a filament excitation voltage, a modulated cathode voltage, a grid 1 voltage, a screen grid 2 voltage, focus grid voltages, and a final anode voltage.

The filament voltage (nominally 6.3V) excites the filaments to generate free electrons to supply the electron beam in the CRT. A cathode voltage is generated on each of the R, G, and B cathodes and controls the amount of beam current developed in the CRT. The focus grid voltages generate an electrical field that functions in a lens-like manner to focus the beam in the midst of its trajectory. The final anode voltage, nominally 30–32 KV, accelerates the beam and electron beam currents will not flow from the cathode to the anode in the absence of the final anode voltage.

The beam current is a function of the cathode voltage, grid 1 voltage and a cutoff voltage. More specifically, the beam current corresponds to Vc-(Vk-Vg1), wherein Vc is the cutoff voltage, Vk is the cathode voltage and Vg1 is the grid 1 voltage. The cutoff voltage is set based on the CRT characteristics and in view of the screen grid voltage. Since the beam current is generally controlled by modulating the cathode, instead of modulating the grid 1 voltage, and beam current is an exponential function of the control voltage, this discussion uses notation that is inverse in sign from physical theory. Thus, for purposes of the present discussion, an increase in screen grid voltage results in increased Vc.

If the grid 1 voltage is approximately zero, and Vc is set to be slightly less than the kinescope driver supply of about +215Vdc, the variation in the cathode voltage Vk controls the amount of beam current that flows in the CRT. For cathode voltage Vk close to Vc, beam current is negligible, while for small Vk, substantial beam current may result.

The cathode voltage is typically generated in response to a video signal by a kinescope driver circuit that includes a multi-stage amplification circuit. The multi-stage amplification circuit is usually coupled to at least a low voltage power supply and a high voltage power supply. The multi-stage amplification circuit may be embodied in the form of an integrated circuit, for example TDA6120Q, manufactured by Philips Semiconductors of Sunnyvale, Calif. It is advantageous to use ICs such as TDA6120Q in high performance video monitors because of their relatively high bandwidth and ability to handle relatively high voltages.

However, in some cases, particularly when the kinescope driver circuit is embodied in the form of an IC, such as the TDA6120Q, the loss of either the low voltage or high voltage power supply to a kinescope driver circuit may result in the loss of cathode voltage. The loss of cathode voltage results in a "zero-biasing" of the CRT, which results in an extremely high beam current. The high cathode current is especially problematic in video display monitors that already operate at relatively high beam currents. High beam currents are desirable to increase the brightness of the display and thereby improve the subjective quality of the picture. However, faults in the kinescope driver circuitry power supplies can easily lead to high beam currents that can permanently damage the phosphors on the display screen. In this connection, faults in the kinescope driver circuitry power supplies may occur due to a variety of different reasons including, but not limited to, break in the wire during manufacturing and/or shipment, and oxidation of the various electrical components.

Currently, safety circuits shutdown the anode voltage supply if the anode voltage levels exceed predetermined levels, in order to prevent excessive x-radiation levels. However, such safety circuits respond to the voltage level of the anode voltage supply, but do not respond to a CRT zero-bias condition that results from faults in the power supplies to the kinescope driver circuit.

Therefore, it is desirable to provide an apparatus and a method for protecting a video display device against a zero-bias condition due to the loss of any one of a plurality of power supplies, which condition results in excessive beam current in the video display device.

In particular, it is desirable to provide an apparatus and a method for protecting a video display monitor against a zero-bias condition due to the loss of any one of a plurality of power supplies associated with any one of a plurality of kinescope driver circuits.

It is also desirable to provide an apparatus and a method for protecting a video display monitor against a zero-bias condition due to the loss of power to a kinescope driver circuit, wherein the kinescope driver circuit is embodied in the form of an integrated circuit.

It is also desirable to provide an apparatus and a method for protecting a video display monitor against the loss of a cathode voltage, which apparatus and method is self-latching and does not reset until the fault is removed.

It is also desirable to provide a video display apparatus and method which disables a high voltage power supply when a fault is detected in any one of a plurality of driver circuit power supplies.

"In an exemplary embodiment, the present invention comprises a protection circuit that shuts down the anode power supply in response to the loss of a power supply to a kinescope driver circuit. In particular, the present invention is a protection circuit comprising: a source of video signals; a driver circuit coupled to the source of video signals and the cathode, the driver circuit coupled to a driver circuit power supply, the driver circuit causing a cathode voltage to be generated on the cathode in response to the video signals and the driver circuit power supply; a high voltage power supply coupled to the anode for providing high voltage accelerating potential in the display device; and a shutdown circuit coupled to the driver circuit power supply and the high voltage power supply, the shutdown circuit disabling the high voltage power supply if an output of the driver circuit power supply decreases below a threshold level."

The invention will be described with reference to the accompanying drawings, wherein.

Figure 1:
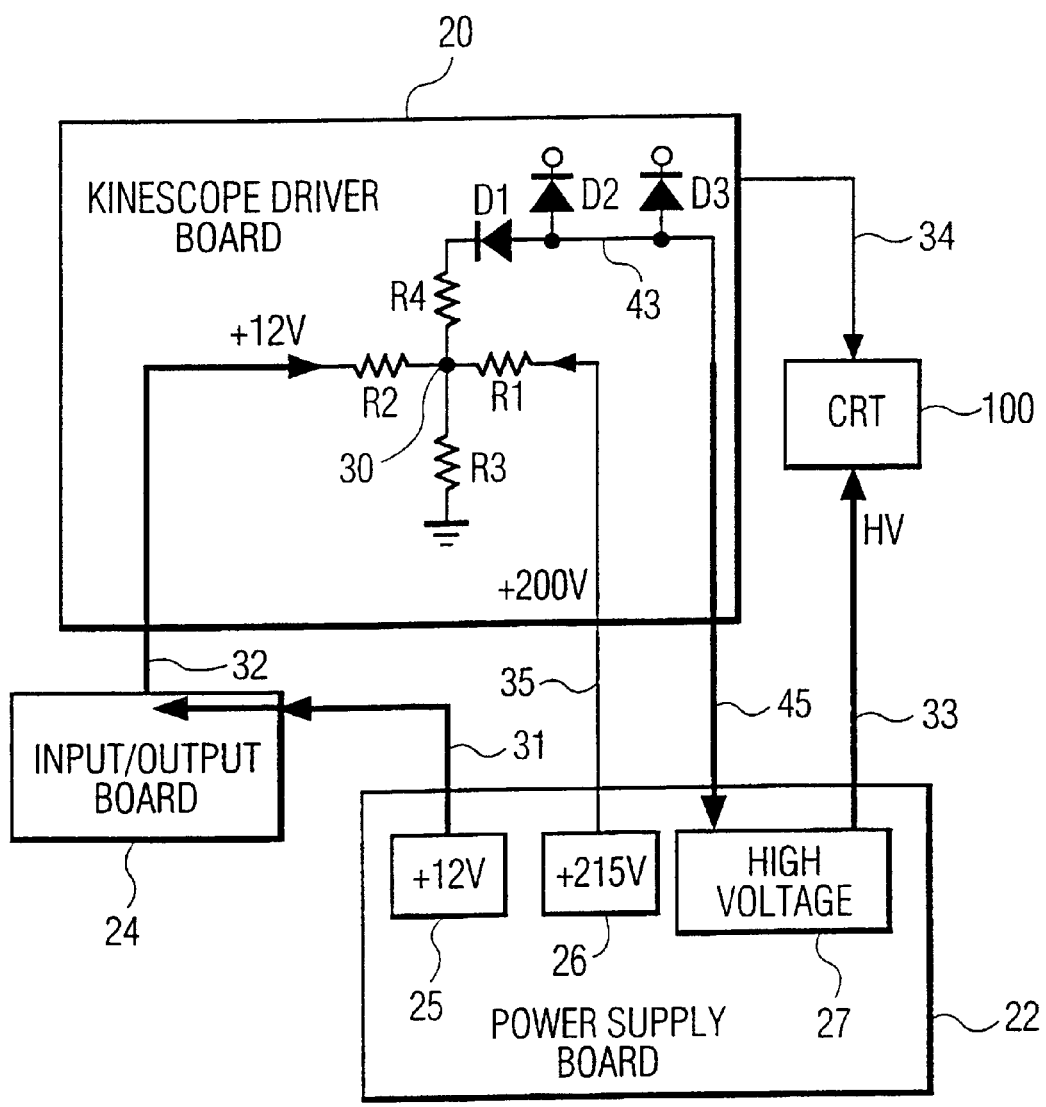
FIG. 1 is a block diagram of a video display protection circuit in accordance with the present invention.

FIG. 1 illustrates a block diagram of video display apparatus which includes a protection circuit in accordance with the present invention. The apparatus comprises power supply board 22 coupled to Input/Output board 24 and kinescope driver board 20 via connector cables 31, 32, 35 and 45. Power supply board 22 includes circuitry associated with +12V supply 25, +215V supply 27 and High Voltage supply 26. +12V supply 25 and +215V supply 27 are used to develop cathode voltage Vk as described further below. High voltage supply 26 is coupled to the anode and provides the accelerating potential.

CRT 100 provides a video display in response to drive signals from kinescope driver board 20 and high voltage from power supply board 22. Each cathode of CRT 100 is driven by a respective output from kinescope driver board 20, here represented by connector 34, although a connector may be necessary for each cathode. High voltage supply 26 is coupled to CRT 100 via connector cable 33.

I/O board 24 generally includes coupling devices that allow the user to connect various signal sources to the CRT. In the present embodiment, +12V supply 25 is connected to kinescope driver board 20 via I/O board 24 as a matter of convenience. However, it is clear that +12V power supply may be coupled to kinescope driver board 20 in any manner as desired.

Kinescope driver board 20 receives the video signals, and the low and high voltage power supplies, and develops a cathode voltage for each cathode associated with the video signal. +12V supply 25 is coupled to kinescope driver board 20 via connector 31, I/O board 24 and connector 32. +215V supply 27 is coupled to kinescope driver board 20 via connector 35. Within kinescope driver board 20, the various power supplies are coupled to each other at sensing node 30, via respective resistors R1 and R2. The voltage at sensing node 30 is coupled to power supply board 22 via diode D1 and resistor R4. The sensing nodes associated with other cathode driver circuits are connected to node 43 via diodes D2 and D3. As described further below, the present protection circuit is arranged so that if a fault is detected in either power supply 25 or power supply 27, via summing node 30 and connector 45, high voltage supply 26 is shutdown by shutdown circuit 44. The fault may result from the failure of the respective power supplies or various connectors becoming disconnected.

Figure 2:
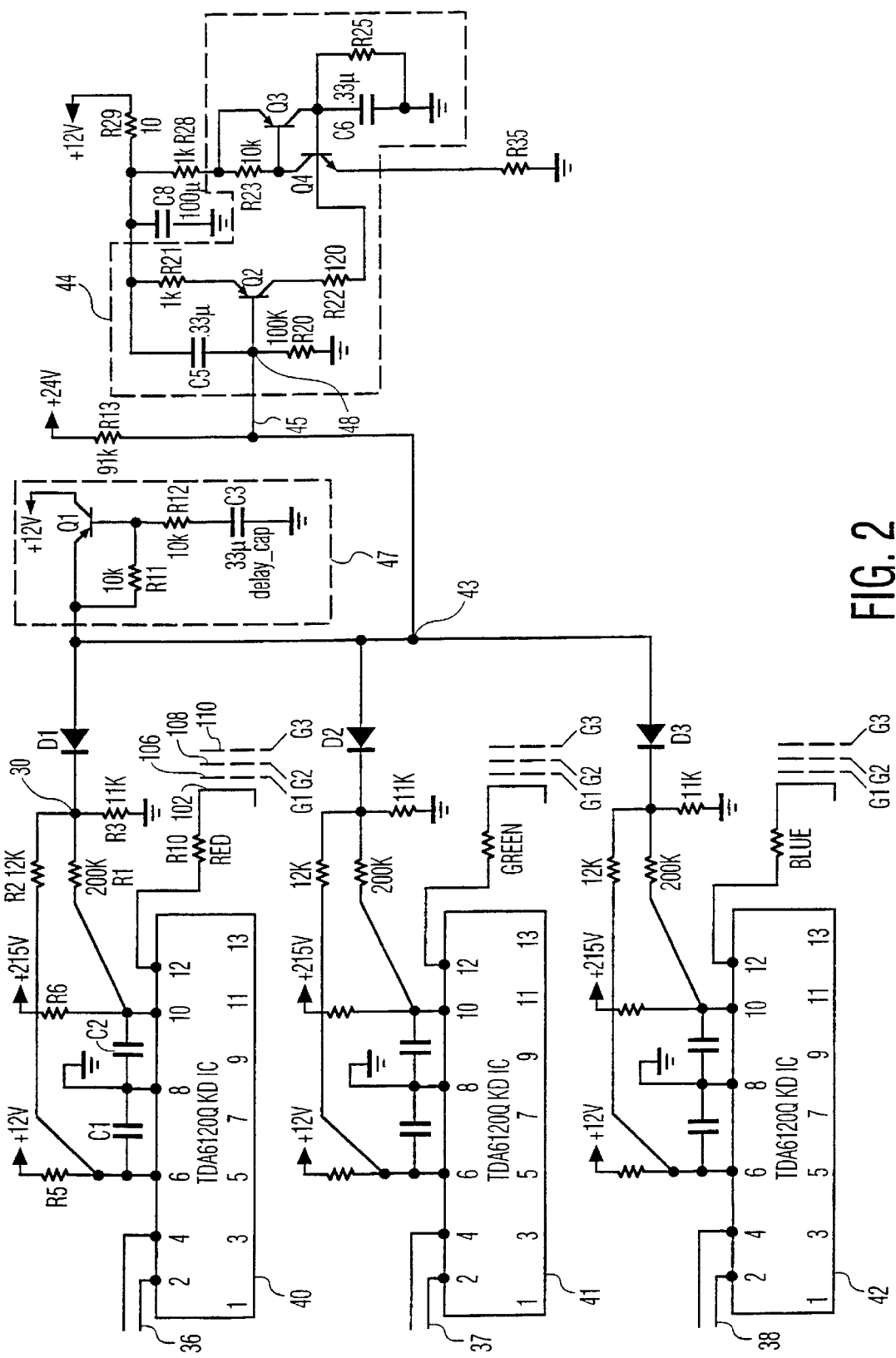
FIG. 2 is a schematic diagram including the summing node for the low voltage and high voltage cathode supplies in accordance with the present invention.

FIG. 2 is a schematic diagram that shows portions of kinescope driver board 20, protection delay circuit 47 and shutdown circuit 44. Kinescope driver board 20 includes cathode driver ICs 40, 41 and 42 for each of the red, green and blue video signals. The circuitry for each of the component colors is identical and only the components associated with the red signal will be described. A suitable driver IC includes, but is not limited to, TDA6120Q manufactured by Philips Semiconductors. Driver IC 40 is coupled to source of signals 36 for receiving the video signal used to control the output to cathode 102. Driver IC 40 includes a multi-stage amplifier disposed therein, and is coupled to a +12V supply at pin 6 and a +215V supply at pin 10. The output of driver IC 40 is provided at pin 1 2 and controls the cathode voltage of red cathode 102. As discussed above, the cathode voltage controls the beam current in CRT 100.

The +12V power supply is also connected to sensing node 30 via resistors R5 and R2. The +215V power supply is connected to sensing node 30 via resistors R6 and R1. Sensing node 30 is coupled to combined sensing node 43 via diode D1. The respective sensing nodes for ICs 41 and 42 are coupled to combined sensing node 43 via respective diodes D2 and D3. The voltage at sensing node 43 is indicative of whether a fault exists on any of the power supplies to ICs 40, 41 and 42. Sensing node 43 is coupled to the base of Q2 of shutdown circuit 44. Diodes D1, D2 or D3 will conduct if either the +12V supply or +215V supply to any of the ICs 40, 41 and 42 is below a threshold value. If any one of the diodes D1, D2 or D3 conduct, the voltage at combined sensing node 43 goes low, causing shutdown circuit 44 to disable the high voltage drive circuit as described further below. In this manner, a fault in either one of the low or high voltage supplies to any of the ICs 40, 41, and 42 causes the high voltage supply to the anode to be shutdown. Delay circuit 47 prevents shutdown of the anode high voltage supply during startup conditions. Since the power supplies to ICs 40, 41 and 42 may not reach their normal levels until a certain finite amount of time during system startup, Q1 maintains the necessary voltage on sensing node 43 during startup to prevent activation of shutdown circuit 44.

Also, the resistors in series with the +12V and +215V supplies are fusable and will open if the ICs fail shorted. Such a failure would cause zero biasing of the CRT and excessive beam current. The excessive beam current is prevented by shutting down the high voltage anode in response to the output of shutdown circuit 44.

Figure 3:
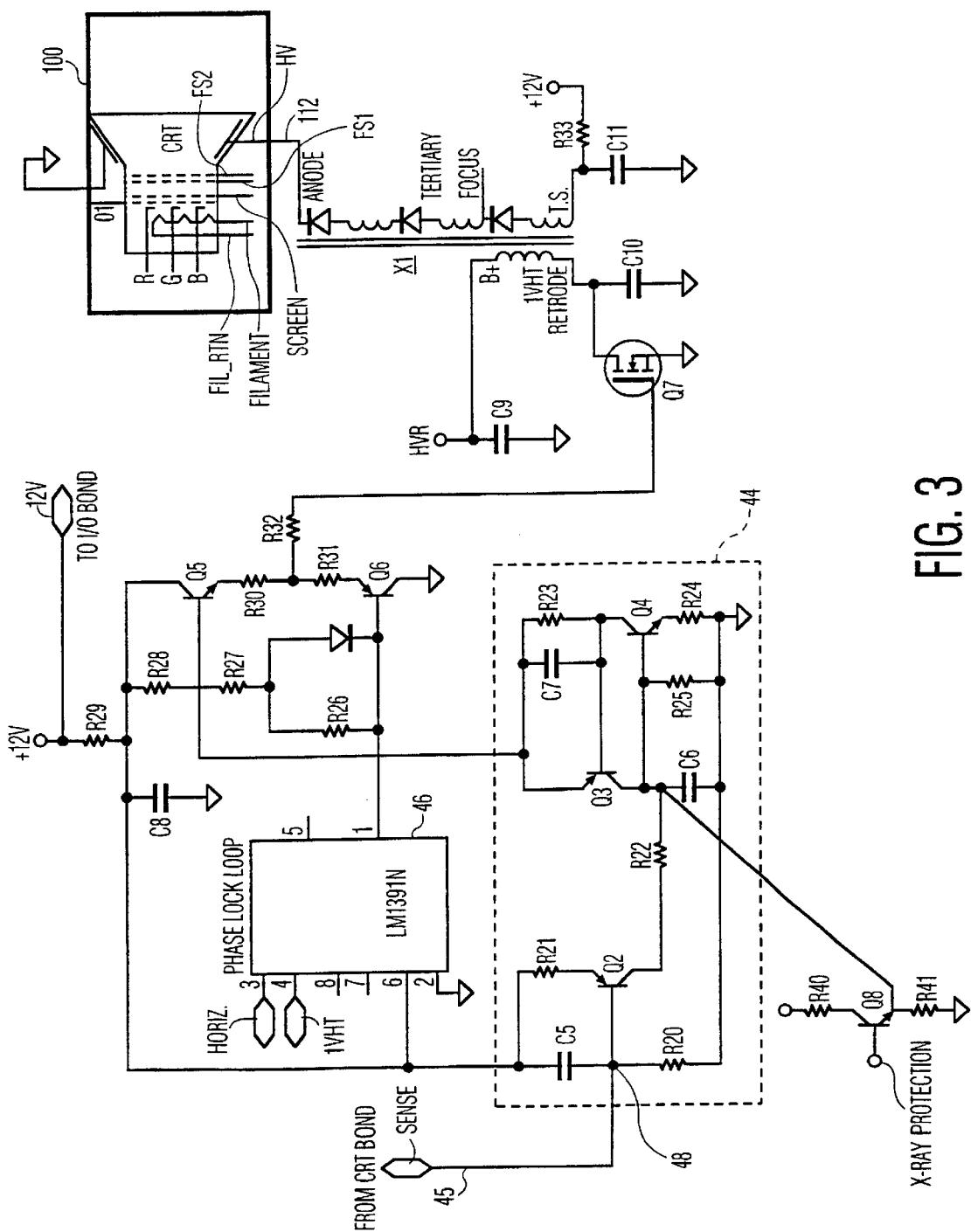
FIG. 3 is a schematic diagram of a high voltage power supply and shutdown circuit in accordance with the present invention.

37 FIG. 3 illustrates the various elements associated with shutdown circuit 44 and the anode high voltage power supply. Sensing mode 43 is connected to the base of transistor Q2 of shutdown circuit 44 via connection 45 and node 48. Shutdown circuit 44 includes a self-biasing latch comprised of transistors Q3 and Q4. During normal operating conditions when the +12V and +215V supplies provide the necessary voltages to driver ICs 40,41 and 42, transistors Q2, Q3 and Q4 are in the OFF state. When a fault is detected at any one of the sensing nodes, the voltage at combined sensing node 43 drops below a predetermined threshold value, thereby reducing the voltage at node 48 and placing Q2 in the ON state. When Q2 turns ON, current is supplied to the base of Q4, placing Q4 in the ON state. When Q4 turns ON, current is supplied to the base of Q3, placing Q3 in the ON state. This action latches Q3 and Q4 into the ON state.

During normal operating conditions, high voltage transformer X1 provides high voltage to anode 112. The operation of high voltage transformer X1 is controlled by phase lock loop 46, a push-pull driver comprising transistors Q5 and Q6, and MOSFET Q7. Transistors Q5 and Q6 are driven by phase lock loop 46 to generate a 10V square wave of approximately 50/50 duty cycle. The square wave drives the high voltage generator MOSFET Q7, which energizes high voltage transformer X1. When PLL 46 drives Q6 to the ON state, the Vcesat of Q6 drives the gate of Q7 below the threshold voltage required for Q7 to conduct, thereby keeping Q7 in the OFF state. When PLL 46 drives the base of Q6 high, R28 provides base current to Q5, supplying MOSFET Q7 with 12V-Vcesat, saturating MOSFET Q7 and energizing the primary of high voltage transformer X1 with current.

When PLL 46 again provides drive to Q6 and removes drive current from Q5, the voltage at the gate of MOSFET Q7 falls below the threshold voltage thereby placing MOSFET Q7 in the OFF state. When MOSFET Q7 turns OFF, the resonant circuit formed by the primary of high voltage transformer X1 and the retrace capacitor C10 present a resonant retrace pulse of approximately 1000V across the primary of high voltage transformer X1. During retrace, the energy stored in the core of the high voltage transformer X1 is transferred to the high voltage winding, or "tertiary", in the form of an impressed voltage of approximately the primary pulse times the turns ratio. This results in a tertiary charging current, which provides charge to anode 112 of CRT 100 as long as the tertiary diodes are forward biased.

The primary supply voltage, B+, is adjusted to maintain a constant anode potential for a variety of frequency and load conditions. For multiple frequency operation, switching of the high voltage generator is synchronized by PLL 46, synchronizing the first loop, the high voltage generator, with the horizontal deflection, and sampling the high voltage transformer X1 retrace pulse for establishment of the second loop error signal.

In the event of a fault which results in a loss of kinescope driver board power supplies, which may cause excessive beam current, the sensed voltage at node 48 causes Q2 to be placed in the ON state. When Q2 goes to the ON state, the self-biasing latch comprised of Q3 and Q4 goes to the ON state thereby drawing current away from the base of Q5. This results in the gate voltage of MOSFET Q7 becoming insufficient to exceed the threshold voltage necessary to turn ON MOSFET Q7. As a result, no energy is stored in the core of high voltage transformer X1. If there is any beam current, the anode is quickly discharged, in the absence of a tertiary charging current. As the anode is discharged, there is no anode accelerating potential to allow damaging beam current. The self-biasing latch comprised of Q3 and Q4 removes the high voltage power supply to the anode until all power supplies are removed, and then restored, saving the CRT from damaging conditions. The anode is quickly discharged due to the use of a resistive element in the negative feedback of the anode voltage to the high voltage power supply. This results in a very fast time constant.

The present protection circuit may be used to shutdown the anode voltage in response to a high voltage level. It is necessary to shutdown the anode voltage if the high voltage exceeds a predetermined threshold level in order to prevent excessive x-radiation from being generated. Here, the output from an X-ray protection sensing circuitry is coupled to the base of Q4 via the emitter of Q8. As such, if the output of the X-ray protection sensing circuitry indicates an excessively high voltage condition, Q8 turns ON, thereby latching Q3 and Q4 into the ON state and activating shutdown circuit 44 as described above.

It will be apparent to those skilled in the art that although the present invention has been described in terms of an exemplary embodiment, modifications and changes may be made to the disclosed embodiment without departing from the essence of the invention. Therefore, it is to be understood that the present invention is intended to cover all modifications as would fall within the true scope and spirit of the present invention.

We claim:

1. In a video display device having an anode and a cathode for generating and controlling beam currents in the display device, a protection circuit comprising:
    a source of video signals;
    a driver circuit coupled to the source of video signals and the cathode, the driver circuit coupled to a driver circuit power supply, the driver circuit causing a cathode voltage to be generated on the cathode in response to the video signals and the driver circuit power supply;
    a high voltage power supply coupled to the anode for providing high voltage accelerating potential in the display device; and
    a shutdown circuit coupled to the driver circuit power supply and the high voltage supply, the shutdown circuit disabling the high voltage power supply if the driver circuit power supply voltage decreases below a threshold level.

2. The protection circuit according to claim 1, wherein the driver circuit is disposed on an integrated circuit and the driver circuit power supply provides at least +215V.

3. The protection circuit according to claim 1, wherein shutdown circuit comprises a self-biasing latch circuit that latches to a first state when the output from the driver circuit power supply voltage decreases below the threshold level.

4. The protection circuit according to claim 1, wherein the driver circuit power supply comprises first and second driver circuit power supplies, the shutdown circuit disabling the high voltage power supply if either one of the first or second power supply voltages decreases below respective first and second threshold levels.

5. The protection circuit according to claim 4, further comprising a combined sensing node that provides a combined output responsive to the first and second driver circuit power supplies, the shutdown circuit disabling the high voltage power supply if the combined output decreases below a second threshold level.

6. The protection circuit according to claim 4, wherein the driver circuit comprises a plurality of driver circuits, each of the driver circuits being associated with a respective source of video signals and a respective cathode, and the shutdown circuit disables the high voltage power supply if any of the first and second power supplies of the plurality of driver circuits decrease below respective first and second threshold levels.

7. The protection circuit according to claim 4, wherein the shutdown circuit comprises a self-biasing latch circuit that latches to a first state when either one of the driver circuit power supply voltages decreases below the threshold level.

8. The protection circuit according to claim 4, wherein the driver circuit power supplies are disposed on a first circuit board, the driver circuit is disposed on a second circuit board, and the high voltage power supply is disposed on a third circuit board.

9. The protection circuit according to claim 1, further comprising an X-ray protection sensor coupled to the shutdown circuit, the shutdown circuit disabling the high voltage power supply if the output of the X-ray protection sensor exceeds a second threshold level.

10. The protection circuit according to claim 9, wherein the shutdown circuit comprises a self-biasing latch circuit that latches to a first state when the driver circuit power supply voltage decreases below the threshold level, the X-ray protection sensor being coupled to the self-biasing latch.

11. The video display apparatus comprising:
    an anode and a cathode for generating and controlling beam currents;
    a source of video signals;
    a driver circuit coupled to the source of video signals and the cathode, the driver circuit coupled to a driver circuit power supply, the driver circuit causing a cathode voltage to be generated on the cathode in response to the video signals and the driver circuit power supply;
    a high voltage power supply coupled to the anode for providing high voltage accelerating potential in the display device; and
    a shutdown circuit coupled to the driver circuit power supply and the high voltage power supply, the shutdown circuit disabling the high voltage power supply if the driver circuit power supply voltage decreases below a threshold level.

12. The video display apparatus according to claim 11, wherein the driver circuit is disposed on an integrated circuit and the driver circuit power supply provides at least +215V.

13. The video display apparatus according to claim 11, wherein the shutdown circuit comprises a self-biasing latch circuit that latches to a first state when the output from the driver circuit power supply voltage decreases below the threshold level.

14. The video display apparatus according to claim 11, wherein the driver circuit power supply comprises first and second driver circuit power supplies, the shutdown circuit disabling the high voltage power supply if either one of the first or second power supply voltages decreases below respective first and second threshold levels.

15. The video display apparatus according to claim 14, further comprising a combined sensing node that provides a combined output responsive to the first and second driver circuit power supplies, the shutdown circuit disabling the high voltage power supply if the combined output decreases below a second threshold level.

16. The video display apparatus according to claim 14, wherein the shutdown circuit comprises a self-biasing latch circuit that latches to a first state when either one of the driver circuit power supply voltages decreases below the threshold level.

17. The video display apparatus according to claim 11, further comprising an X-ray protection sensor coupled to the shutdown circuit, the shutdown circuit disabling the high voltage power supply if the output of the X-ray protection sensor exceeds a second threshold level.

18. The video display apparatus according to claim 11, wherein the shutdown circuit comprises a self-biasing latch circuit that latches to a first state when the driver circuit power supply voltage decreases below the threshold level, the X-ray protection sensor being coupled to the self-biasing latch.

* * * * *